(12) United States Patent
Barker (10) Patent No.: US 7,970,247 B2
(45) Date of Patent: Jun. 28, 2011

(54) BUFFER TUBES FOR MID-SPAN STORAGE

(75) Inventor: Jeffrey Scott Barker, Statesville, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 12/558,390

(22) Filed: Sep. 11, 2009

(65) Prior Publication Data

US 2010/0067855 A1    Mar. 18, 2010

Related U.S. Application Data (60) Provisional application No. 61/096,545, filed on Sep. 12, 2008, provisional application No. 61/096,750, filed on Sep. 12, 2008, provisional application No. 61/113,146, filed on Nov. 10, 2008, provisional application No. 61/139,228, filed on Dec. 19, 2008.

(51) Int. Cl.
*G02B 6/44* (2006.01)
(52) U.S. Cl. ......... 385/100; 385/109; 385/110; 385/114
(58) Field of Classification Search .................. None
See application file for complete search history.

(56) References Cited

U.S. PATENT DOCUMENTS

| | | | |
|---|---|---|---|
| 4,838,643 A | 6/1989 | Hodges et al. |
| 4,859,223 A | 8/1989 | Kajioka et al. |
| 4,893,998 A | 1/1990 | Schlaeppi et al. |
| 5,372,757 A | 12/1994 | Schneider |
| 5,574,816 A | 11/1996 | Yang et al. |
| 5,627,932 A | 5/1997 | Kiel et al. |
| 5,717,805 A | 2/1998 | Stulpin |
| 5,761,362 A | 6/1998 | Yang et al. |
| 5,852,698 A | 12/1998 | Bringuier |
| 5,903,693 A | 5/1999 | Brown |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,278,831 B1 | 8/2001 | Henderson et al. |
| 6,292,611 B1 * | 9/2001 | Chamberlain et al. ........ 385/114 |
| 6,314,224 B1 | 11/2001 | Stevens et al. |

(Continued)

FOREIGN PATENT DOCUMENTS

EP    1361465 A1    11/2003

(Continued)

OTHER PUBLICATIONS

U.S. Appl. No. 61/096,750, filed Sep. 12, 2008, pp. 1-55.

(Continued)

*Primary Examiner* — Tina M Wong
(74) *Attorney, Agent, or Firm* — Summa, Additon & Ashe, P.A.

(57) ABSTRACT

Disclosed is a buffer tube that possesses a higher buffer-tube filling coefficient. Optical fibers enclosed within the buffer tube demonstrate improved attenuation performance when subjected to temperature variations between about −40° C. and 70° C. The buffer tube is suitable for deployments requiring mid-span access.

26 Claims, 4 Drawing Sheets

U.S. PATENT DOCUMENTS

| | | |
|---|---|---|
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,389,204 B1 | 5/2002 | Hurley |
| 6,389,214 B1 | 5/2002 | Smith et al. |
| 6,493,491 B1 | 12/2002 | Shen et al. |
| 6,579,014 B2 | 6/2003 | Melton et al. |
| 6,594,427 B1 | 7/2003 | Dixon et al. |
| 6,603,908 B2 | 8/2003 | Dallas et al. |
| 6,618,538 B2 | 9/2003 | Nechitalio et al. |
| 6,634,075 B1 | 10/2003 | Lento |
| 6,648,520 B2 | 11/2003 | McDonald et al. |
| 6,658,184 B2 | 12/2003 | Bourget et al. |
| 6,749,446 B2 | 6/2004 | Nechitalio |
| 6,771,861 B2 | 8/2004 | Wagner et al. |
| 6,801,696 B2 | 10/2004 | Davis et al. |
| 6,813,422 B1 | 11/2004 | Krishnamurthy et al. |
| 6,912,347 B2 | 6/2005 | Rossi et al. |
| 6,922,515 B2 | 7/2005 | Nechitalio et al. |
| 6,941,049 B2 | 9/2005 | Risch et al. |
| 7,035,510 B2 | 4/2006 | Zimmel et al. |
| 7,045,010 B2 | 5/2006 | Sturman, Jr. |
| 7,162,128 B2 | 1/2007 | Lovie et al. |
| 7,270,485 B1 | 9/2007 | Robinson et al. |
| 7,272,282 B1 | 9/2007 | Seddon et al. |
| 7,280,725 B2 | 10/2007 | Brown et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,373,055 B1 | 5/2008 | Strong |
| 7,373,057 B2 | 5/2008 | Pizzorno et al. |
| 7,391,944 B2 | 6/2008 | Storaasli et al. |
| 7,483,613 B2 | 1/2009 | Bigot-Astruc et al. |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,639,915 B2 | 12/2009 | Parris et al. |
| 7,646,952 B2 | 1/2010 | Parris |
| 7,646,954 B2 | 1/2010 | Tatat |
| 7,817,891 B2 | 10/2010 | Lavenne et al. |
| 2002/0001443 A1 | 1/2002 | Bringuier |
| 2002/0168155 A1* | 11/2002 | Rossi et al. .................. 385/109 |
| 2003/0026919 A1 | 2/2003 | Kojima et al. |
| 2003/0099446 A1* | 5/2003 | Witt et al. .................... 385/109 |
| 2005/0031276 A1 | 2/2005 | Zimmel et al. |
| 2005/0228062 A1 | 10/2005 | Wolf et al. |
| 2005/0234145 A1 | 10/2005 | Sitzmann et al. |
| 2005/0241820 A1 | 11/2005 | Wasserman et al. |
| 2005/0276551 A1 | 12/2005 | Brown et al. |
| 2007/0047884 A1 | 3/2007 | Storaasli et al. |
| 2007/0104429 A1 | 5/2007 | Yokokawa et al. |
| 2007/0127878 A1 | 6/2007 | de Memontmorillon et al. |
| 2007/0214841 A1 | 9/2007 | Pedrido |
| 2007/0274647 A1 | 11/2007 | Pizzorno et al. |
| 2008/0138026 A1 | 6/2008 | Yow et al. |
| 2008/0317410 A1 | 12/2008 | Griffioen et al. |
| 2009/0003785 A1 | 1/2009 | Parris et al. |
| 2009/0175583 A1 | 7/2009 | Overton |
| 2009/0252469 A1 | 10/2009 | Sillard et al. |
| 2009/0279833 A1 | 11/2009 | Overton et al. |
| 2009/0279835 A1 | 11/2009 | de Memontmorillon et al. |
| 2009/0279836 A1 | 11/2009 | de Memontmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1* | 3/2010 | Lovie et al. .................. 385/113 |
| 2010/0092135 A1 | 4/2010 | Barker et al. |
| 2010/0092140 A1* | 4/2010 | Overton ....................... 385/112 |
| 2010/0154479 A1 | 6/2010 | Milicevic et al. |

FOREIGN PATENT DOCUMENTS

| | | |
|---|---|---|
| EP | 1369724 A2 | 12/2003 |
| EP | 1420279 A2 | 5/2004 |
| EP | 1515171 A1 | 3/2005 |
| EP | 1921478 A1 | 5/2008 |
| EP | 2163928 A2 | 3/2010 |
| WO | 2007/013923 A1 | 2/2007 |
| WO | 2009/062131 A1 | 5/2009 |

OTHER PUBLICATIONS

U.S. Appl. No. 61/113,146, filed Nov. 10, 2008, pp. 1-53.
U.S. Appl. No. 60/986,737, filed Nov. 9, 2007, pp. 1-60.
U.S. Appl. No. 61/041,484, filed Apr. 1, 2008, pp. 1-73.
U.S. Appl. No. 61/112,595, filed Nov. 7, 2008, pp. 1-315.
U.S. Appl. No. 61/101,337, filed Sep. 30, 2008, pp. 1-59.
U.S. Appl. No. 61/112,006, filed Nov. 6, 2008, pp. 1-63.
U.S. Appl. No. 61/112,374, filed Nov. 7, 2008, pp. 1-74.
U.S. Appl. No. 60/969,401, filed Aug. 31, 2007, pp. 1-54.
U.S. Appl. No. 61/139,228, filed Dec. 19, 2008, pp. 1-50.
European Search Report in commonly owned European Application No. 09011651 dated Aug. 11, 2010 (counterpart of related U.S. Appl. No. 12/577,055).
Corning, "Installing a Furcation Kit on a Composite Drop Cable," SRP-006-110, Issue 4, Nov. 2003, pp. 1-4, Corning Cable Systems LLC, Hickory, NC.
Draka, Product specification for "ezDrop Flat Cable—Connectorized," Issue Date: May 21, 2009, Claremont, NC, pp. 1-2.
Corning, product specification for "OptiTap Connector," EVO-592-EN, Corning Cable Systems LLC, Hickory, NC, Sep. 2005, pp. 1-2.
U.S. Appl. No. 12/098,804, for a "Transmission Optical Fiber Having Large Effective Area," Sillard et al., filed May 6, 2009.

* cited by examiner

FIG. 2
Coefficient of Thermal Expansion

FIG. 3
Total Shrinkage

BUFFER TUBES FOR MID-SPAN STORAGE

CROSS-REFERENCE TO PRIORITY APPLICATIONS

This application claims the benefit of the following commonly assigned applications: U.S. Provisional Application No. 61/096,545 (filed Sep. 12, 2008); U.S. Provisional Application No. 61/096,750 (filed Sep. 12, 2008); U.S. Provisional Application No. 61/113,146 (filed Nov. 10, 2008); and U.S. Provisional Application No. 61/139,228 (Dec. 19, 2008). Each of the foregoing patent applications is hereby incorporated by reference in its entirety.

FIELD OF INVENTION

The present invention relates to optical-fiber cables and buffer tubes. The present invention, for instance, embraces buffer tubes that are particularly suitable for mid-span deployments.

BACKGROUND OF THE INVENTION

As compared with traditional wire-based networks, optical fiber communication networks are capable of transmitting significantly more information at significantly higher speeds. Optical fibers, therefore, are being increasingly employed in communication networks.

To expand total transmission throughput, optical-fiber network providers are attempting to place ever more optical fibers in ever-smaller spaces. Packing fibers into tight spaces, however, can cause undesirable attenuation. Indeed, there is an inherent trade-off between increased fiber density and signal attenuation.

Many optical-fiber cables designed for installation in microducts (e.g., via blowing) achieve high fiber counts and relatively small cable diameters. For example, commonly assigned U.S. Pat. No. 6,912,347 (Rossi et al.), which is hereby incorporated by reference in its entirety, achieves optical-fiber cables with high fiber counts and small cable diameters.

Such optical-fiber cables can achieve higher fiber densities, but the constituent buffer tubes have unsatisfactory mid-span storage performance as positioned in pedestals, cabinets, or other optical-fiber enclosures. By way of illustration, after installation in a microduct, an optical-fiber cable typically experiences temperature cycles during use. These temperature cycles can lead to signal attenuation. Thus, a fiber-optic cable that is less susceptible to attenuation is more suitable for such installations (e.g., installations requiring mid-span storage).

Similarly, U.S. Patent Publication No. 2007/0274647 A1 (Pizzorno et al.), now U.S. Pat. No. 7,373,057, each of which is hereby incorporated by reference in its entirety, discloses an optical-fiber cable structure suitable for microduct installation. This publication requires the use of bend-insensitive fibers to reduce cable size.

Despite efforts to achieve high-fiber-density optical-fiber cables that can be installed in microducts, a need continues to exist for improved optical-fiber cables and buffer tubes that not only possess desirable optical fiber densities, but also are capable of satisfactory mid-span storage.

SUMMARY OF THE INVENTION

In general, as buffer-tube filling coefficients increase so too does the problem of attenuation during mid-span storage. At higher filling coefficients, buffer tubes must have better dimensional stability (e.g., reduced post-extrusion shrinkage) to provide satisfactory mid-span performance.

In this regard, post-extrusion shrinkage (PES) is often a contributing factor to attenuation experienced during mid-span storage of optical-fiber buffer tubes and cables. In particular, post-extrusion shrinkage, which can occur when a buffer tube is subjected to elevated temperatures, may cause unwanted increases in excess fiber length (EFL).

Accordingly, it is an object of the present invention to provide optical-fiber buffer tubes possessing a higher filling coefficient while ensuring that the optical fibers enclosed therein demonstrate improved attenuation performance when subjected to temperature variations (e.g., between −40° C. and 70° C.).

It is another object of the present invention to provide optical-fiber buffer tubes that include standard single-mode fibers (SSMF) and that have a higher filling coefficient.

It is yet another object of the present invention to provide optical-fiber buffer tubes that include standard single-mode fibers (SSMF) configured in a way that promotes low attenuation.

It is yet another object of the present invention to provide optical-fiber buffer tubes that include standard single-mode fibers (SSMF) and that are capable of satisfactory mid-span storage over a wide range of temperatures.

It is yet another object of the present invention to provide optical-fiber buffer tubes that meet the mid-span standard found in Bulletin 1753F-601 (PE-90) from the United States Department of Agriculture Rural Electrification Administration.

It is yet another object of the present invention to provide optical-fiber buffer tubes that meet the mid-span standard defined by Telcordia Technologies generic requirements for optical-fiber cables as set forth in GR-20-CORE (Issue 2, July 1998; Issue 3, May 2008; Mid-Span Buffer Tube Performance of Stranded Cable—6.5.11).

It is yet another object of the present invention to provide optical-fiber buffer tubes that exhibit low post-extrusion shrinkage.

It is yet another object of the present invention to provide optical-fiber buffer tubes formed of a polyolefin, such as a nucleated polypropylene-polyethylene copolymer.

The foregoing, as well as other objectives and advantages of the invention and the manner in which the same are accomplished, is further specified within the following detailed description and its accompanying figures.

DETAILED DESCRIPTION

As noted, the invention embraces an optical-fiber buffer tube having a higher fiber count and yet suitable for deployments requiring mid-span access.

An exemplary optical-fiber cable includes one or more (e.g., six or so) buffer tubes according to the present invention positioned within a cable jacket (e.g., a polymeric sheath). At least one of the buffer tubes includes a plurality of optical fibers (e.g., 12-24 optical fibers). More typically, each of the buffer tubes positioned within the cable jacket include optical fibers (e.g., six buffer tubes each enclosing 24 optical fibers).

The optical fibers employed in the buffer tubes according to the present invention are typically conventional standard single-mode fibers (SSMF) possessing diameters of between about 235 microns and 265 microns (i.e., the combined diameter of the glass fiber and its coatings). That said, it is within the scope of the invention to employ optical fibers having smaller diameters (e.g., 200 microns or so). Suitable single-mode optical fibers that are compliant with the ITU-T G.652.D standard are commercially available, for instance, from Draka Comteq (Claremont, N.C.). The respective ITU-T G.652 standards are hereby incorporated by reference in their entirety.

Optical-fiber cables in accordance with the present invention meet or exceed certain Telcordia Technologies generic requirements for optical-fiber cables as set forth in GR-20-CORE (Issue 2, July 1998; Issue 3, May 2008), such as low-temperature and high-temperature cable bend (6.5.3), impact resistance (6.5.4), compression (6.5.5), tensile strength of cable (6.5.6), cable twist (6.5.7), cable cyclic flexing (6.5.8), mid-span buffer tube performance of stranded cable (6.5.11), temperature cycling (6.6.3), cable aging (6.6.4), cable freezing (6.6.5), and water penetration (6.6.7). These GR-20-CORE generic requirements (i.e., Issue 2, July 1998, and Issue 3, May 2008, respectively) are hereby incorporated by reference in their entirety.

Moreover, the optical-fiber cables and buffer tubes according to the present invention possess outstanding performance when subjected to extreme temperature variations. In this regard, the present optical-fiber buffer tubes demonstrate exceptional resistance to attenuation as determined by temperature cycle testing. For example, under testing conditions modified from the U.S. Department of Agriculture's Bulletin 1753F-601 (PE-90) (Rural Electrification Administration), the present optical-fiber buffer tubes demonstrate mean increases in optical-fiber attenuation of less than 0.05 dB. Furthermore, each optical fiber that is enclosed within a buffer tube typically demonstrates increased optical-fiber attenuation of less than 0.1 dB.

To achieve low optical-fiber attenuation that satisfies mid-span temperature cycle testing, it may be beneficial to employ buffer tubes with a low filling coefficient (i.e., the buffer tubes within the cabling should not be overfilled). Alternatively, it may be beneficial to employ low-shrink buffer tubes having higher filling coefficients.

Though prior fiber-optic cabling has employed buffer tubes having relatively low filling coefficients, the resulting fiber-optic cables have possessed relatively low cable fiber densities. Conversely, efforts to increase fiber densities within optical-fiber cables have heretofore required the use of buffer tubes with higher filling coefficients (i.e., increasing the fiber count within a buffer tube of a given cross-sectional area), resulting in buffer-tubes with poor mid-span performance.

The optical-fiber cables of the present invention improve upon such past efforts by achieving relatively high cable filling coefficients (and cable fiber densities), while employing buffer tubes with exceptional mid-span performance. In other words, the optical fibers employed in buffer tubes in accordance with the present invention demonstrate exceptional performance when subjected to mid-span temperature cycling testing.

As used herein, the term "cable filling coefficient" of an optical-fiber cable refers to the ratio of the sum of the cross-sectional areas of all of the optical fibers within the optical-fiber cable versus the inner cross-sectional area of the optical-fiber cable (i.e., defined by the inner boundary of the protective outer jacket). As used herein and unless otherwise noted, the term "cable filling coefficient" employs the inner cross-sectional area of the optical-fiber cable.

Conversely, the term "outer cable filling coefficient" specifically refers to the ratio of the sum of the cross-sectional areas of all of the optical fibers within the optical-fiber cable versus the outer cross-sectional area of the optical-fiber cable (i.e., defined by the outer boundary of the protective outer jacket).

Optical-fiber cables of the present invention have relatively high cable fill ratios (i.e., cable filling coefficients). Optical-fiber cables having higher fill ratios are desirable because they increase the amount of information that can be passed through a cable while decreasing the amount of space that the optical-fiber cable requires for installation.

As used herein, the term "cable fiber density" of an optical-fiber cable refers to the ratio of the total number of optical fibers within the optical-fiber cable versus the cross-sectional area of the optical-fiber cable as defined by the outer boundary of the protective outer jacket. Optical-fiber cables of the present invention have relatively high cable fiber densities. Optical-fiber cables having higher cable fiber densities are desired, because such high-fiber-density cables have an increased number of optical fibers and/or require less space for installation.

As used herein, the term "buffer-tube filling coefficient" refers to the ratio of the total cross-sectional area of the fibers within a buffer tube versus the inner cross-sectional area of that buffer tube (i.e., defined by the inner boundary of the buffer tube). Optical-fiber cables of the present invention include buffer tubes typically having a buffer-tube filling coefficient between about 0.2 and 0.6, such as between about 0.3 and 0.4 (e.g., about 0.33).

Alternatively, to the extent that non-circular buffer tubes are used, the longest inner cross-sectional width of the buffer tube can be used to define the diameter of a theoretical circularized buffer tube cross-sectional area (e.g., $\pi(D_{max}/2)^2$). As used herein, the term "circularized buffer-tube filling coefficient" refers to the ratio of the total cross-sectional area of the optical fibers enclosed within buffer tubes versus the sum of the theoretical circularized cross-sectional areas of the buffer tubes containing those optical fibers.

The circularized buffer-tube filling coefficient is one convenient way to characterize the cross-sectional area of an irregularly shaped buffer tube. Those having ordinary skill in the art will appreciate that for all but circular buffer tubes, the buffer-tube filling coefficient and the circularized buffer-tube filling coefficient are unequal.

Additionally, as used herein, the term "cumulative buffer-tube filling coefficient" refers to the ratio of the total cross-sectional area of the optical fibers enclosed within buffer tubes versus the sum of the inner cross-sectional areas of the buffer tubes containing those optical fibers.

Generally, optical-fiber cables with higher buffer-tube filling coefficients are more susceptible to attenuation over the length of the optical-fiber cable. Cables containing buffer tubes having a lower buffer-tube filling coefficient are typically less susceptible to attenuation when subjected to temperature cycling. That said, the present invention embraces low-shrink buffer tubes having higher buffer-tube filling coefficients. Therefore, the optical-fiber buffer tubes of the present invention are less susceptible to attenuation and are suitable for mid-span storage.

The present optical-fiber buffer tubes are suitable for mid-span storage even in extreme temperatures. In this regard, fiber-optic cables suitable for mid-span storage are typically subjected to a mid-span temperature cycle test, which assures certain minimum performance specifications for fiber-optic cables. As noted, one such test can be found in Bulletin 1753F-601 (PE-90) from the United States Department of Agriculture Rural Electrification Administration, which is hereby incorporated by reference in its entirety, an excerpt of which is provided as Appendix I in priority U.S. Patent Application Nos. 61/096,750 and 61/113,146.

As used herein and unless otherwise specified, reference to the "mid-span test," the "mid-span temperature cycle test," or the "temperature cycle test" refers the testing procedures set forth in the USDA Rural Electrification Administration mid-span standard, which is outlined as follows:

According to the USDA Rural Electrification Administration mid-span standard, buried and underground loose tube single-mode cables intended for mid-span applications with tube storage should meet the following mid-span test without exhibiting an increase in fiber attenuation greater than 0.1 dB and a maximum average increase over all fibers of 0.05 dB.

Initially, the test section of the optical-fiber cable is installed in a commercially available pedestal or enclosure (or in a device that mimics their performance) as follows: A length of the protective outer jacket, equal to the mid-span length (e.g. 20 feet), is removed from the middle of the test specimen to allow access to the buffer tubes. All binders, tapes, strength members, etc. are removed. The buffer tubes are left intact. The cable ends defining the ends of the mid-span length are properly secured in the enclosure (i.e., as they would be secured within an enclosure in regular commercial use). The strength members are secured with an end stop type clamp and the protective outer jacket is clamped to prevent slippage. A minimum of 6.096 meters (20 feet) of cable extends from the entry and exit ports of the enclosure (i.e., 20 feet of the cable remain outside of the enclosure), so that optical measurements may be taken. Typically, the buffer tubes are wound in a coil with a minimum width of three (3) inches and minimum length of 12 inches. The exposed buffer tubes are loosely constrained during the test.

The enclosure, with installed cable, is placed in an environmental chamber for temperature cycling. It is acceptable for some or all of the two 20-foot (6.096 meters) cable segments (i.e., the cable segments that remain outside of the enclosure) to extend outside the environmental chamber.

Lids, pedestal enclosures, or closure covers should be removed if possible to allow for temperature equilibrium of the buffer tubes.

The attenuation of the optical fibers is measured at 1550±10 nanometers. The supplier of the optical-fiber cable must certify that the performance of lower specified wavelengths complies with the mid-span performance requirements.

After measuring the attenuation of the optical fibers, the cable is tested per the FOTP-3 temperature-cycling standard. Temperature cycling, measurements, and data reporting must conform to the FOTP-3 standard. The test is conducted for at least five complete cycles. The following detailed test conditions are applied (i.e., using the environmental chamber) to the enclosure containing the optical-fiber cable: (A) loose tube single-mode optical cable sample shall be tested; (B) an 8-inch to 12-inch diameter optical buried distribution pedestal or a device that mimics their performance shall be tested; (C) mid-span opening for installation of loose tube single-mode optical cable in pedestal shall be 6.096 meters (20 feet); (D) three hours soak time (i.e., exposure time); (E) Test Condition C-2, minimum −40° C. (−40° F.) and maximum 70° C. (158° F.); (F) a statistically representative amount of transmitting fibers in all express buffer tubes passing through the pedestal and stored shall be measured; and (G) the buffer tubes in the enclosure or pedestal shall not be handled or moved during temperature cycling or attenuation measurements.

Fiber cable attenuation measured through the exposed buffer tubes during the last cycle at −40° C. (−40° F.) and +70° C. (158° F.) should not exceed a maximum increase of 0.1 dB and should not exceed a 0.05 dB average across all tested fibers from the initial baseline measurements. At the conclusion of the temperature cycling, the maximum attenuation increase at 23° C. from the initial baseline measurement should not exceed 0.05 dB in order to allow for measurement noise that may be encountered during the test. The cable should also be inspected at room temperature at the conclusion of all measurements. The cable should not show visible evidence of fracture of the buffer tubes nor show any degradation of the exposed cable assemblies.

Additionally, optical-fiber buffer tubes according to the present invention have undergone the mid-span temperature cycle test described (above) and fulfilled the minimum performance specification of the USDA Rural Electrification Administration mid-span standard. Additionally, these buffer-tube embodiments were subjected to harsher conditions than required by the USDA Rural Electrification Administration mid-span standard. For example, buffer-tube embodiments of the present invention were soaked at 70° C. for 14 hours, which is longer than the three hours required by the testing conditions set forth in the aforementioned USDA bulletin. Typically, under these harsher conditions only one temperature cycle is performed.

In this regard, it has been observed that attenuation for the initial temperature cycle tends to be higher than for subsequent temperature cycles. This counterintuitive observation means that testing over one cycle yields higher tested attenuation levels than testing over multiple temperature cycles (e.g., five or more as set forth in the USDA Rural Electrification Administration mid-span standard).

This modified mid-span standard is hereinafter referred to as the "modified USDA Rural Electrification Administration mid-span standard." A longer soak time (i.e., exposure time) may alter the deformation of the buffer tubes because of post-extrusion shrinkage differences at this temperature (i.e., the buffer tubes may shrink in length because of the amorphous orientation generated during the extrusion process and/or crystallization).

Buffer-tube embodiments of the present invention also passed a mid-span temperature cycle test with conditions similar to FOTP-3 with the exception that the soak time at −40° C. was reduced from three hours to one hour. This change of conditions probably did not affect the results of the test because the change in dimensions of the buffer tubes at low temperatures should be exclusively due to the coefficient of expansion (i.e., reversible thermal contraction and expansion).

Optical-fiber buffer tubes according to the present invention should meet the minimum performance specifications required by the USDA Rural Electrification Administration mid-span standard.

Another mid-span standard is defined by Telcordia Technologies generic requirements for optical-fiber cables as set forth in GR-20-CORE (Issue 2, July 1998; Issue 3, May 2008; Mid-Span Buffer Tube Performance of Stranded Cable—6.5.11), which is hereby incorporated by reference in its entirety and hereinafter referred to as the "GR-20-CORE mid-span standard." This GR-20-CORE mid-span standard is less rigorous than the foregoing mid-span temperature-cycle test standard defined by the United States Department of Agriculture Rural Electrification Administration. Accordingly, the optical-fiber cables that meet the aforementioned Rural Electrification Administration's mid-span temperature cycle test should also meet or exceed the GR-20-CORE mid-span standard.

To satisfy the GR-20-CORE generic requirements with mid-span buffer tube performance, loose tube single-mode cables should exhibit an average change in fiber attenuation of no more than 0.15 dB at 1550 nanometers after mid-span testing. According to the generic requirements for optical-fiber cables as set forth in GR-20-CORE (Mid-Span Buffer Tube Performance of Stranded Cable—6.5.11), "[s]tranded loose-tube cables designed to have loose tubes stored in a pedestal or closure shall be capable of having a minimum of 14 feet of expressed buffer tube stored in a pedestal or closure in normal outside plant conditions without experiencing any unacceptable loss in the optical fibers stored in the expressed tubes."

In view of the foregoing and as noted, exemplary optical-fiber cables according to the present invention can include a plurality of buffer tubes positioned within a polymeric cable jacket.

In one exemplary embodiment, the optical-fiber cable includes 144 optical fibers apportioned across six buffer tubes (e.g., six buffer tubes each enclosing 24 optical fibers). In another exemplary embodiment, the optical-fiber cable includes 108 optical fibers apportioned across six buffer tubes (e.g., six buffer tubes each enclosing 18 optical fibers). In yet another exemplary embodiment, the optical-fiber cable includes 72 optical fibers apportioned across six buffer tubes (e.g., six buffer tubes each enclosing 12 optical fibers).

The optical-fiber cables according to the present invention typically possess cable filling coefficients of at least about 0.08, more typically cable filling coefficients of at least about 0.09 (e.g., about 0.95 or more). In some embodiments, optical-fiber cables possess cable filling coefficients of at least about 0.10 (e.g., about 0.11 or more).

Similarly, optical-fiber cables according to the present invention typically possess cable fiber densities of at least about 1.5 fibers/mm$^2$, more typically cable fiber densities of at least about 1.65 fibers/mm$^2$ (e.g., about 1.66 fibers/mm$^2$ or more).

At the same time, the optical-fiber cables according to the present invention typically include one or more low-shrink buffer tubes possessing a buffer-tube filling coefficient of between about 0.2 and 0.6 (e.g., between about 0.3 and 0.5, such as about 0.35). More typically, the present buffer tubes posses a buffer-tube filling coefficient between about 0.3 and 0.45. In one embodiment, the present buffer tubes may possess a buffer-tube filling coefficient of between about 0.2 and 0.4 (e.g., between about 0.25 and 0.35).

Those having ordinary skill in the art will appreciate that to the extent that the optical fibers in the fiber-optic cable are equally apportioned among the same-sized buffer tubes, the buffer-tube filling coefficient for the particular buffer tubes will equal the optical-fiber cable's cumulative buffer-tube filling coefficient. That said, it is within the scope of the present invention to unequally apportion optical fibers within the plurality of buffer tubes. Similarly, it is within the scope of the present invention to include within the fiber optic cables one or more optical fibers that are not enclosed within a buffer tube.

In accordance with the foregoing, the optical-fiber cables according to the present invention typically include buffer tubes that possess circularized buffer-tube filling coefficients of between about 0.2 and 0.6, such as between about 0.35 and 0.5.

A particular embodiment of the present optical-fiber cable includes a plurality of buffer tubes positioned within a polymeric sheath (i.e., the cable jacket). Each buffer tube encloses a plurality of optical fibers (e.g., 24 optical fibers), such that the optical-fiber cable possesses a cable filling coefficient of at least about 0.09 and a cumulative buffer-tube filling coefficient of between about 0.3 and 0.6.

Yet another embodiment of the present optical-fiber cable includes a plurality of buffer tubes positioned within a polymeric sheath (i.e., the cable jacket). Each buffer tube encloses a plurality of optical fibers (e.g., 24 optical fibers), such that the optical-fiber cable possesses a cable fiber density of at least about 1.65 fibers/mm$^2$ and a cumulative buffer-tube filling coefficient of between about 0.3 and 0.6.

As noted, the present invention embraces buffer tubes having low shrinkage (e.g., low post-extrusion shrinkage). For example, the present buffer tubes may exhibit post-extrusion shrinkage (PES) of less than about 0.5 percent, typically less than about 0.4 percent. More typically, the present buffer tubes may exhibit PES less than about 0.3 percent.

A post-extrusion shrinkage of less than about 0.5 percent means that the present buffer tubes are capable of withstanding conditions between about −40° C. to about +70° C. Otherwise, such a broad temperature range can cause undesirable expansions and contractions in the buffer tubes, and hence optical fiber attenuation.

Post-extrusion shrinkage determinations can be made using either of two exemplary methods, namely the conventional oven method and the thermo-mechanical analyzer method, hereinafter referred to as the "TMA method."

In the conventional oven method, jacket and tube specimens are cut to lengths of 150 millimeters. Initial length ($L_i$) is measured by a micrometer and recorded. Specimens are placed on a bed of talc in aluminum pans and aged in an oven at 85° C. for four hours. After the four-hour aging period specimens are allowed to cool for one hour. The final length ($L_f$) is measured and recorded. Percent shrinkage is calculated as follows: $[(L_i-L_f)/L_i]\times 100$.

In the TMA method, a small 2-3 millimeter specimen is cut from the jacket or tube and sandwiched between quartz plates before being placed on the TMA sample stage. Initial length in z-axis is measured and recorded by the TMA instrument. Length measurements are recorded at ten data points per second while the specimen is subjected to the following temperature program: (i) equilibrate at 25° C. for 10 minutes; (ii) ramp to −40° C. at 10° C. per minute; (iii) ramp to 85° C. at a rate of 10° C. per minute; and (iv) ramp to −40° C. at a rate of 10° C. per minute. TMA data analysis software may be used to calculate the shrinkage.

To facilitate reduced PES, the present buffer tubes may comprise a nucleated polyolefin copolymer material (e.g., a nucleated polypropylene-polyethylene copolymer). Nucleated polyolefin copolymer materials have high thermal stability, thus buffer tubes employing such materials are less susceptible to PES.

Figure 1:
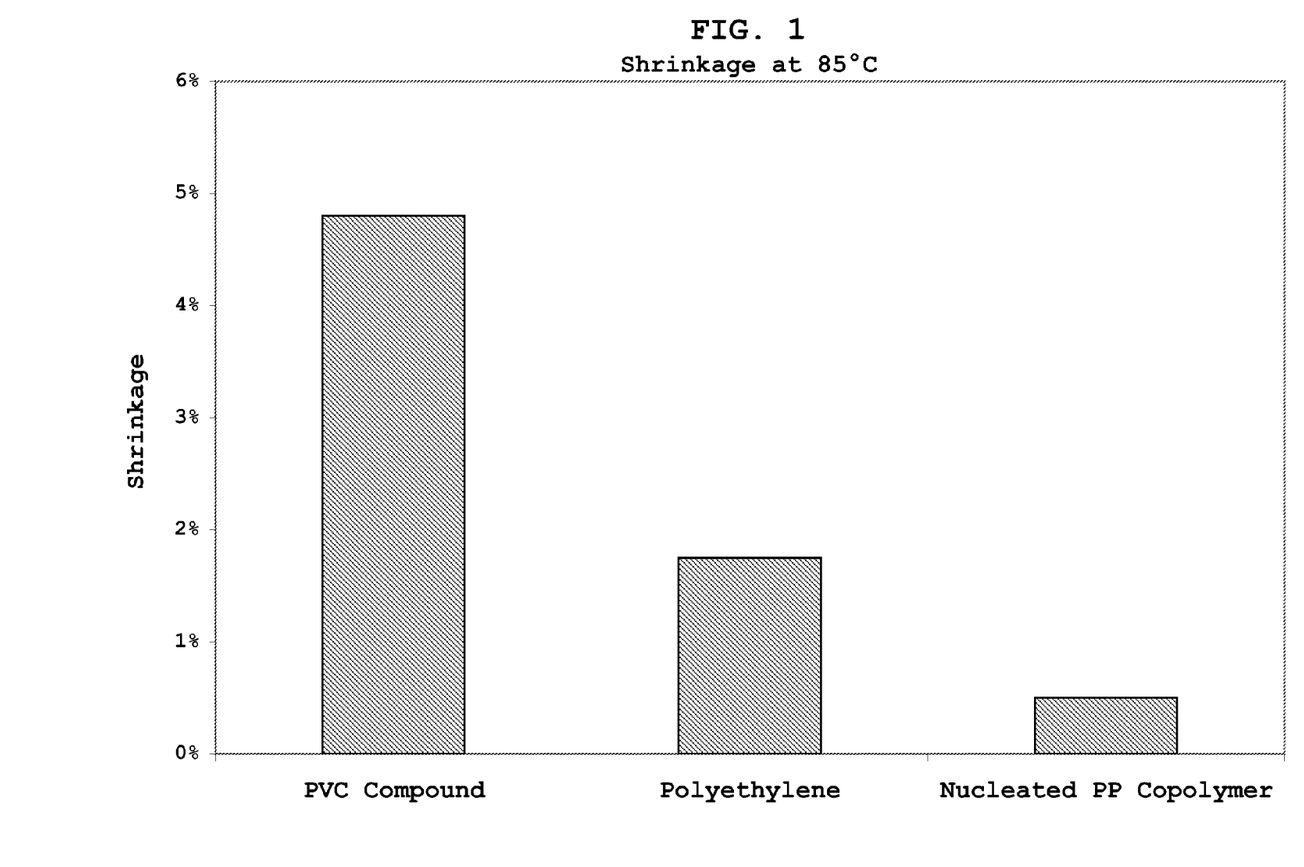
FIG. 1 graphically illustrates shrinkage values observed for a nucleated polypropylene-ethylene copolymer material as compared with polyvinyl chloride (PVC) and polyethylene materials.

Table 1 (below) and FIG. 1 illustrates characteristic shrinkage values observed for PVC, polyethylene, and a nucleated polypropylene-ethylene copolymer after heating at 85° C. for one hour.

TABLE 1

| 85° C. (for 1 hour) | PVC Compound | Polyethylene | Nucleated PP Copolymer |
|---|---|---|---|
| Shrinkage | 4.80% | 1.75% | 0.50% |

Buffer-tube contraction at −40° C. can be dominated by post-extrusion shrinkage of the buffer-tube material, but the coefficient of thermal expansion (CTE) of the buffer-tube material may also contribute substantially. The nucleated polypropylene copolymer can also have a reduced coefficient of thermal expansion relative to alternative buffer-tube compounds that are based on polyethylene or PVC.

Figure 2:
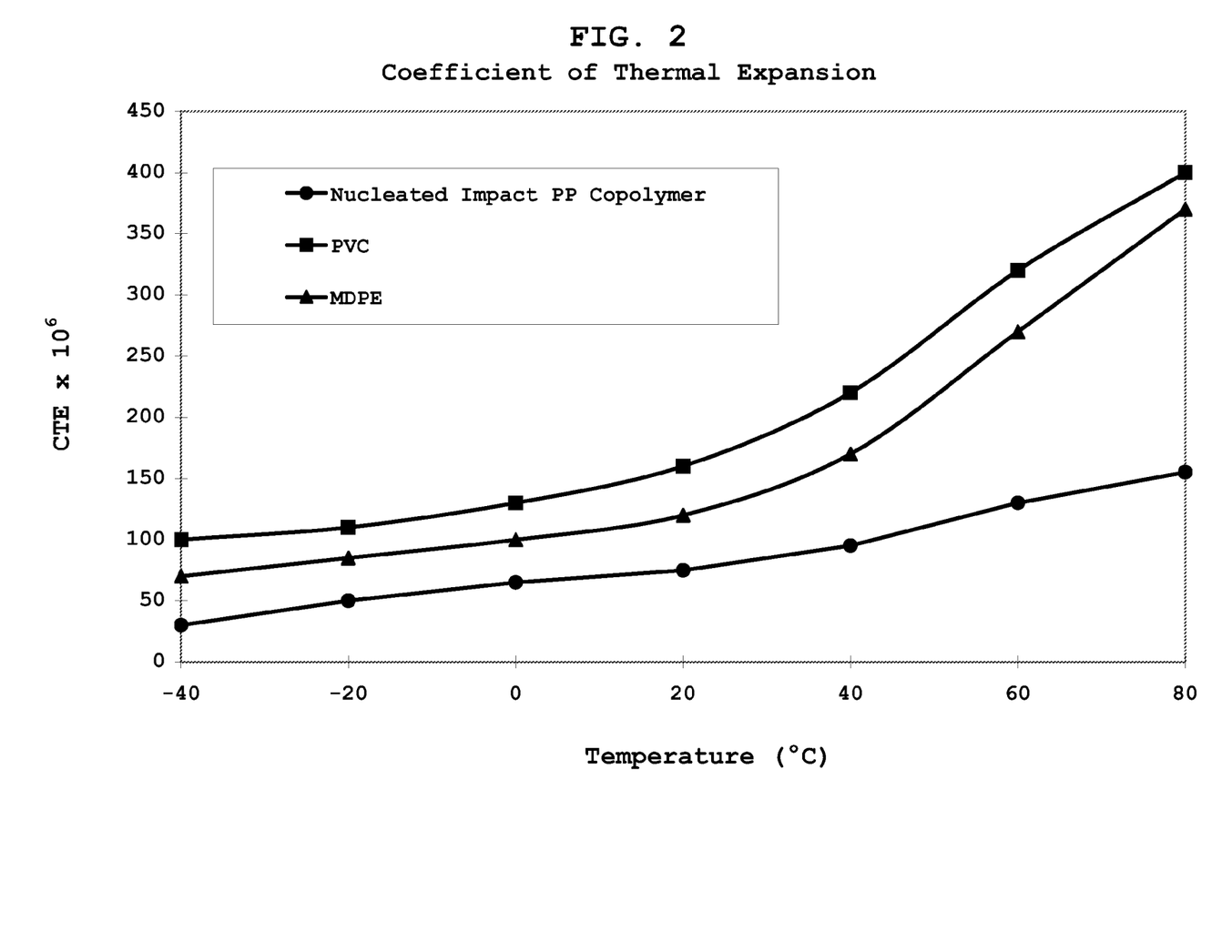
FIG. 2 graphically illustrates coefficient of thermal expansion (CTE) values for a nucleated polypropylene copolymer as compared with polyvinyl chloride (PVC) and polyethylene.

In an exemplary embodiment, the present buffer tube exhibits a coefficient of thermal expansion of less than about 50 um/m ° C. at −40° C. and/or less than about 100 um/m° C. at 23° C. Table 2 (below) and FIG. 2 illustrate the substantial reduction in coefficient of thermal expansion for a nucleated polypropylene copolymer as compared with PVC and polyethylene, respectively.

TABLE 2

| Temperature (° C.) | Nucleated PP Copolymer CTE (μm/m° C.) | PVC CTE (μm/m° C.) | MDPE CTE (μm/m° C.) |
|---|---|---|---|
| −40 | 30 | 100 | 70 |
| −20 | 50 | 110 | 85 |
| 0 | 65 | 130 | 100 |
| 20 | 75 | 160 | 120 |
| 40 | 95 | 220 | 170 |
| 60 | 130 | 320 | 270 |
| 80 | 155 | 400 | 370 |

Figure 3:
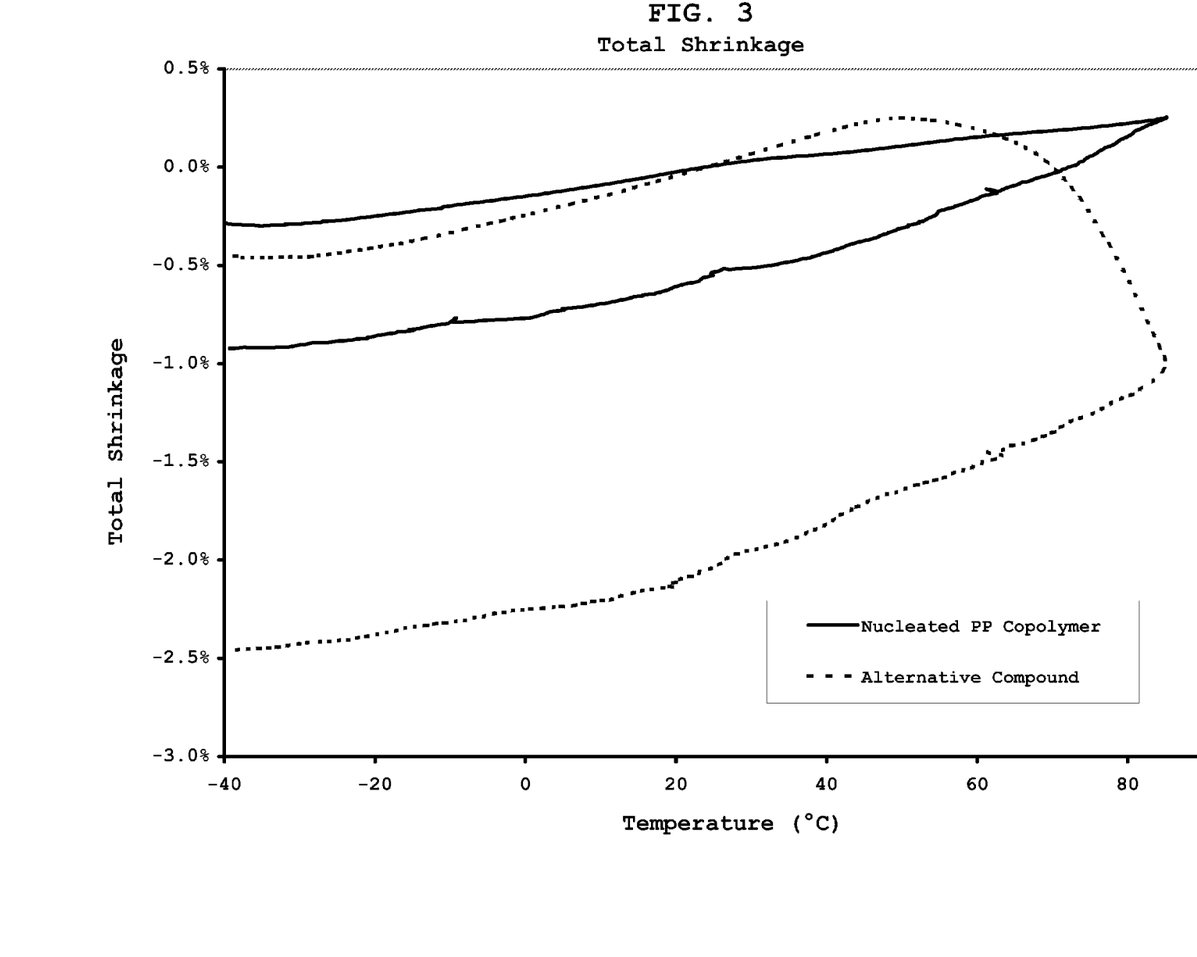
FIG. 3 graphically illustrates total shrinkage measurements for a nucleated polypropylene copolymer and an alternative material when cycled from about room temperature to about −40° C. to about +85° C. to about −40° C.

Exemplary polyolefin materials suitable for use in the present buffer tubes are disclosed, for example, in U.S. Pat. No. 5,761,362 (Yang et al.) and U.S. Pat. No. 5,911,023 (Risch et al), each of which is herein incorporated by reference in its entirety. FIG. 3 graphically presents total shrinkage/contraction measurements for a nucleated polypropylene copolymer material and an alternative material when cycled from about room temperature to about −40° C. to about +85° C. to about −40° C.

Reduced post-extrusion shrinkage may also be facilitated by the way in which buffer tubes are manufactured. The following patents, each of which is incorporated by reference in its entirety, pertain at least in part to methods for sheathing optical fibers with controlled fiber-to-sheath length ratios: commonly assigned U.S. Pat. No. 7,373,055 (Strong); U.S. Pat. No. 6,634,075 (Lento); U.S. Pat. No. 5,372,757 (Schneider); and U.S. Pat. No. 4,893,998 (Schlaeppi et al.). For example, optical-fiber buffer tubes having reduced post-extrusion shrinkage can be achieved via a steady-state buffering process that employs a clenching capstan.

Figure 4:
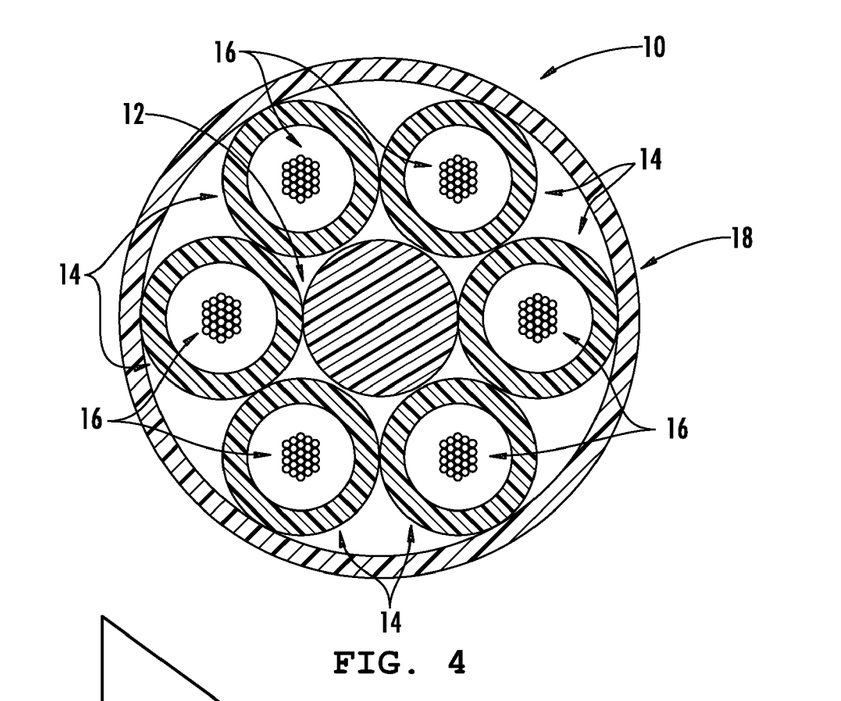
FIG. 4 schematically depicts a cross-sectional view of an exemplary embodiment of an optical-fiber cable employing buffer tubes according to the present invention.

With reference to FIG. 4, the optical-fiber cable 10 of the present invention may be installed not only in traditional undergrounds ducts (i.e., ducts having an inner diameter of around 32 millimeters) but also in microducts (i.e., ducts having an inner diameter of 15 millimeters or less). Typically, microducts have an inner diameter of 13 millimeters or less.

In general, to achieve satisfactory long-distance blowing performance (e.g., between about 3,000 to 5,000 feet or more), the outer cable diameter of an optical-fiber cable 10 should be no more than about 70 to 80 percent of the microduct's inner diameter. For example, an optical-fiber cable 10 that is to be installed via a blowing method in a microduct having an inner diameter of 13 millimeters should have an outer diameter of between about 9 millimeters and about 10.5 millimeters.

In accordance with the foregoing, the optical-fiber cable 10 of the present invention may be constructed as a loose tube cable. An optical-fiber cable 10 with a loose tube structure typically includes: a central strength member 12 having a compressive stiffness that inhibits substantial contraction of the cable 10; a number of buffer tubes 14 (e.g. loose tubes) arranged around the central strength member 12 and containing loosely placed optical fibers 16; and a protective outer jacket 18. An exemplary protective outer jacket has a thickness of between about 0.4 millimeter and 1.0 millimeter (e.g., about 0.6 millimeter).

Additional elements may be placed within the buffer tubes 14 between the interior walls of the buffer tubes 14 and the enclosed optical fibers 16. Alternatively, elements may be placed outside the buffer tubes 14 between the respective exterior walls of the buffer tubes 14 and the interior wall of the cable jacket. For example, yarns or fabrics (e.g., tapes) containing water-swellable material and/or coated with water-swellable powders (e.g., including super absorbent polymers (SAPs)) may be employed.

The buffer tubes 14 may also contain a thixotropic composition (e.g., grease or grease-like gels) between the optical fibers 16 and the interior walls of the buffer tubes 14. Such compositions are understood by those having ordinary skill in the art.

The present invention also embraces dry cable and buffer-tube structures (e.g., grease-free buffer tubes). Exemplary buffer tube structures that are free from thixotropic filling greases are disclosed in commonly assigned U.S. patent application Ser. No. 12/146,588 (Parris et al.), now published as U.S. Patent Application Pub. No. 2009/0003785, each of which is hereby incorporated by reference in its entirety.

To preserve the integrity of the signal transported by optical-fiber cables 10, certain design factors warrant consideration. First, forces may develop on the optical fibers 16 because of contact with rough, hard, or uneven surfaces within the optical-fiber cable 10. Such contact, for example, may result from thermal cable expansion or contraction, which can cause microbending and macrobending. This, in turn, can lead to signal attenuation or signal loss. Layers of protective coatings and claddings around the optical fibers 16 can help to reduce the forces that cause these unwanted effects.

Second, the optical fibers 16 are typically coupled to the surrounding buffer tube 14 in some way. This coupling prevents the optical fibers 16 from pulling back inside the buffer tube 14 as a result of processing, installation, handling, or thermally induced dimensional changes. Not only can these effects hamper accessibility to the fibers 16 during connection operations (e.g., splicing), but also insufficient coupling can lead to excess and/or unevenly distributed optical fiber length (e.g., optical fibers 16 accumulating in a confined space). Such accumulation may cause bending or otherwise force contact between the optical fibers 16 and other cable elements, which can likewise lead to microbending and macrobending.

Third, optical-fiber cables 10 are typically used with electronic devices. If water intruding into the cables 10 can spread (e.g., flow) along the length of the cables 10 to these electronic devices, severe damage to the electronic systems may result. It is also thought that the formation of ice within an optical-fiber cable 10 can impose onto the optical fibers 16 localized microbend-inducing forces or macrobend-inducing forces. Fillers and water-blocking layers within the cables 10 can impede the movement of water within the cables 10 and thereby limit such damage.

The undesirable effects of signal loss, coupling failure, and water damage can be reduced through the use of protective layers and coupling elements. The addition of these layers, however, can lead to larger cables 10, which are not only more costly to produce and store but also heavier, stiffer, and thus more difficult to install.

Manufacturers have typically addressed these problems by employing water-blocking, thixotropic compositions (e.g., grease or grease-like gels). For example, filling the free space inside a buffer tube 14 with water-blocking, petroleum-based filling grease helps to block the ingress of water. Further, the thixotropic filling grease mechanically (i.e., viscously) couples the optical fibers 16 to the buffer tube 14. That usefulness notwithstanding, such thixotropic filling greases are relatively heavy and messy, thereby hindering connection and splicing operations. Consequently, filling greases carry certain disadvantages.

In some embodiments, additional elements (e.g., a mechanical reinforcing layer such as a glass thread or aramid thread) may be placed between the buffer tubes 14 and the protective outer jacket 18. Typically, the buffer tubes 14 are wrapped in a binder (e.g., a water-swellable binder or tape) to facilitate assembly. In such embodiments the protective outer jacket 18 is placed around the binder and buffer tubes 14.

Positioning the strength member 12 in the center of the optical-fiber cable 10 (i.e., centrally positioned within the annular space defined by the protective outer jacket 18) facilitates blowing performance. This central positioning of the strength member 12 balances the cable bending and axial stiffness of the optical-fiber cable 10. In this regard, when an optical-fiber cable 10 is installed (e.g., via blowing), it is desirable for the cable 10 to exhibit low bending stiffness such that the cable 10 will readily pass though bends or turns in the duct, yet also have enough stiffness to be pushed into the duct without folding or buckling. The use of a central strength member 12 helps to minimize the bending stiffness, yet ensures that the axial stiffness is sufficient enough such that the cable 10 will not buckle in the duct.

In some embodiments, the central strength member 12 of the optical-fiber cable 10 of the present invention has an outer diameter of between one and five millimeters. Typically, the central strength member 12 has an outer diameter of between two and four millimeters. As will be known by those having ordinary skill in the art, central strength members 12 may be formed from glass-reinforced plastic. In this regard, exemplary glass-reinforced plastic (GRP) might include between about 80 and 90 weight-percent glass.

Optical-fiber cables 10 according to the present invention typically contain 144 or more optical fibers 16, but certainly can contain fewer provided the overall cable fiber density is maintained.

The optical fibers 16 may include conventional single-mode fibers, which may comply with the ITU-T G.652 standards (e.g., satisfying the ITU-T G.652 recommended fiber attributes with respect to single-mode optical fibers) but not with either the ITU-T G.657.A standard or the ITU-T G.657.B standard. The ITU-T G.657.A/B standards are hereby incorporated by reference in their entirety.

Those of ordinary skill in the art will appreciate that conventional optical fibers are typically sensitive to microbending and/or macrobending, which can lead to unwanted attenuation. Therefore, the present buffer tubes have reduced post-extrusion shrinkage (PES) to enable higher filling coefficients without causing unsatisfactory levels of attenuation.

The buffer tubes of the present invention may employ conventional single-mode optical fibers (e.g., SSMF) that have, at a wavelength of 1550 nanometers, microbending sensitivity of more than 3.5 (dB/km)/(gf/mm), such as 4.0 (dB/km)/(gf/mm) or more, when measured by an expandable drum apparatus at a temperature between about −30° C. and 60° C. This particular microbending-sensitivity test is disclosed in U.S. Patent Publication No. 2007/0274647 and its counterpart U.S. Pat. No. 7,373,057 (Pizzorno), which, as noted, are incorporated by reference in their entirety.

As noted, exemplary single-mode glass fibers for use in the present invention are commercially available from Draka Comteq (Claremont, N.C.) under the trade name BendBright®, which is compliant with the ITU-T G.652.D requirements.

That said, the optical fibers 16 may include bend-tolerant (e.g., bend-insensitive) optical fibers. Typically, optical-fiber cables 10 including bend-insensitive optical fibers have higher buffer-tube filling coefficients (e.g., by having a higher fiber count, or by having smaller diameter buffer tubes 14) than optical-fiber cables 10 including standard optical fibers 16. Bend-insensitive optical fibers perform better (i.e., are less susceptible to attenuation) than standard optical fibers 16 in the mid-span temperature cycle test at higher buffer-tube filling coefficients.

Therefore, buffer tubes in accordance with the present invention may employ bend-insensitive glass fibers that meet the ITU-T G.657.A standard and/or the ITU-T G.657.B standard.

Exemplary bend-insensitive single-mode glass fibers for use in the present invention are commercially available from Draka Comteq (Claremont, N.C.) under the trade name BendBright$^{XS}$®, which is compliant with both the ITU-T G.652.D and ITU-T G.657.A/B standards. BendBright$^{XS}$® optical fibers demonstrate significant improvement with respect to both macrobending and microbending.

As set forth in U.S. Patent Application No. 60/986,737 for a "Microbend-Resistant Optical Fiber" (Overton), U.S. Patent Application No. 61/041,484 for a "Microbend-Resistant Optical Fiber" (Overton), U.S. Patent Application No. 61/112,595 for a "Microbend-Resistant Optical Fiber" (Overton), International Patent Application Publication No. WO 2009/062131 A1 and its related International Patent Application No. PCT/US08/82927 for a "Microbend-Resistant Optical Fiber" (Overton), and U.S. Patent Application Publication No. US 2009/0175583 and its related U.S. patent application Ser. No. 12/267,732 for a "Microbend-Resistant Optical Fiber" (Overton), each patent document of which is hereby incorporated by reference in its entirety, pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× as compared with a single-mode fiber employing a conventional coating system). Accordingly, it is further within the scope of the present invention to employ microbend-insensitive glass fiber.

In this regard, microbending can be analyzed according to the IEC fixed-diameter sandpaper drum test (i.e., IEC TR62221, Method B, 40-micron grade sandpaper), which provides a microbending stress situation that affects single-mode fibers even at room temperature. The IEC TR62221 microbending-sensitivity technical report and standard test procedures (e.g., IEC TR62221, Method B (fixed-diameter sandpaper drum) and Method D (basketweave)) are hereby incorporated by reference in their entirety.

In accordance with the foregoing, at wavelengths between 1200 nanometers and 1700 nanometers (e.g., 1550 nanometers or 1625 nanometers), microbend-insensitive optical fibers can possess spectral attenuation added losses of less than about 0.1 db/km (e.g., about 0.05 dB/km or less) as measured in accordance with IEC TR62221, Method B (40-micron grade sandpaper). In contrast, at wavelengths between 1200 nanometers and 1700 nanometers (e.g., 1550 nanometers or 1625 nanometers), conventional standard single-mode optical fibers (SSMF) might possess spectral attenuation added losses of more than about 0.25 dB/km, typically more than about 0.3 dB/km (about 0.4 dB/km or more) as measured in accordance with IEC TR62221, Method B (40-micron grade sandpaper).

Without being bound to any theory, it is believed that using bend-insensitive optical fibers in the fiber optic cables according to the present invention would make practicable even higher cable filling coefficients (and cable fiber densities, too). By way of non-limiting example, employing bend-insensitive optical fibers might facilitate the achievement of cable filling coefficients of at least about 0.13 (e.g., between about 0.16 and 0.24), and perhaps 0.30 or more, and cable fiber densities of about 2.5 fibers/mm$^2$ (e.g., between about 2.9 fibers/mm$^2$ and 3.4 fibers/mm$^2$) and perhaps 4.0 fibers/mm$^2$ or more. In such super-high-density cable configurations, the cumulative buffer-tube filling coefficients, for example, may fall between about 0.4 and 0.75.

In accordance with the foregoing, suitable glass fibers for use in the present invention include glass fibers such as those disclosed in U.S. Pat. No. 4,838,643 for a "Single Mode Bend Insensitive Fiber for Use in Fiber Optic Guidance Applications" (Hodges et al.); U.S. Patent Application Publication No. US 2007/0127878 A1 and its related U.S. patent application Ser. No. 11/556,895 for a "Single Mode Optical Fiber" (de Montmorillon et al.); U.S. Pat. No. 7,587,111 and its related U.S. patent application Ser. No. 11/697,994 for a "Single-Mode Optical Fiber" (de Montmorillon et al.); U.S. Pat. No. 7,356,234 and its related U.S. patent application Ser. No. 11/743,365 for "Chromatic Dispersion Compensating Fiber" (de Montmorillon et al.); U.S. Pat. No. 7,555,186 and its related U.S. patent application Ser. No. 11/999,333 for an "Optical Fiber" (Flammer et al.); U.S. Patent Application No. 61/101,337 for a "Single Mode Optical Fiber" (de Montmorillon et al.); U.S. Patent Application No. 61/112,006 for a "Bend-Insensitive Single-Mode Optical Fiber" (de Montmorillon et al.); U.S. Patent Application No. 61/112,374 for a "Bend-Insensitive Single Mode Optical Fiber" (de Montmorillon et al.); U.S. patent application Ser. No. 12/436,423 for a "Single-Mode Optical Fiber Having Reduced Bending Losses" (de Montmorillon et al.); and U.S. patent application Ser. No. 12/436,484 for a "Bend-Insensitive Single-Mode Optical Fiber" (de Montmorillon et al.). Each of these commonly assigned patent documents is hereby incorporated by reference in its entirety.

Optical-fiber cables 10 may include a plurality of buffer tubes 14 (e.g., between two and twelve buffer tubes 14, such as six buffer tubes).

The individual buffer tubes 14 are in close proximity to the other buffer tubes 14 and the central strength member 12. For example, in an optical-fiber cable 10 containing six buffer tubes 14, an individual buffer tube 14 may contact two adjacent buffer tubes 14, the central strength member 12, and the protective outer jacket 18 (i.e., the six buffer tubes 14 are positioned around the central strength member 12 as depicted in FIG. 4).

Typically, all of the buffer tubes 14 within a single optical-fiber cable 10 of the present invention have the same outer diameters and inner diameters. For example, if the optical-fiber cable 10 contains six buffer tubes 14, all six buffer tubes 14 have the same outer diameter and inner diameter. The buffer tubes in accordance with the present invention may have an outer diameter ranging from about 1.3 millimeters to about three millimeters (e.g., about 1.5 to 2.5 millimeters). In an exemplary embodiment of the present invention, the buffer tubes 14 may have an outer diameter of about 2.0 millimeters. In another exemplary embodiment, the buffer tubes 14 may have an outer diameter of less than about three millimeters (e.g., about 2.5 to 3.0 millimeters). In yet another exemplary embodiment, the buffer tubes 14 may have an outer diameter of three millimeters and an inner diameter of 2.2 millimeters. That said, buffer tubes having varying inner diameters and varying outer diameters are within the scope of the present invention.

Typically, the buffer tubes 14 are tubular (i.e., the cross-section of the buffer tubes 14 is a circle). In a possible embodiment, however, the buffer tubes 14 may be formed as quadrant portions of a circular cross-section, such that the buffer tubes 14 fill a relatively larger area between the central strength member 12 and the protective outer jacket 18 (e.g., each buffer tube 14 is shaped somewhat like a trapezoid in which its respective bases are arcs and/or chords).

The shapes of the buffer tubes 14 within a single optical-fiber cable 10 may vary (i.e., all of the buffer tubes 14 are not required to have the same shape). In some embodiments, the buffer tubes 14 may be formed as a so-called "slotted core" within the optical-fiber cable.

The optical fibers 16 may be distributed evenly among the buffer tubes 14 (i.e., each tube 14 contains an equal number of optical fibers 16). For example, an optical-fiber cable 10 containing 144 optical fibers 16 and six buffer tubes 14 may have 24 optical fibers 16 per buffer tube 14.

The buffer tubes 14 containing the optical fibers 16 may be stranded around the central strength member 12. For example, the buffer tubes 14 can be positioned externally adjacent to and stranded around the central strength member 12. The stranding can be accomplished in one direction, helically, known as "S" stranding, or Reverse Oscillated Lay stranding, known as "S-Z" stranding. Stranding about the central strength member 12 increases the operational and installation flexibility of the optical-fiber cable 10. S-Z stranding, for example, allows easy unraveling of the buffer tubes 14 for mid-span access.

In other embodiments, the buffer tubes 14 containing the optical fibers 16 are simply placed externally adjacent to the central strength member 12 (i.e., the buffer tubes 14 are not intentionally stranded or arranged around the central strength member 12 in a particular manner and run substantially parallel to the central strength member 12).

Optical-fiber cables 10 according to the present invention also typically include a protective outer jacket 18 provided around the buffer tubes 14 containing optical fibers 16. In some embodiments, the protective outer jacket 18 maintains a substantially uniform thickness over the length of the optical-fiber cable 10. The thickness of the protective outer jacket 18 may be adjusted to reduce or increase the overall diameter of the optical-fiber cable 10 or to provide greater protection to the optical-fiber cable 10. In one embodiment, the protective outer jacket 18 is 0.6 millimeter thick.

The protective outer jacket 18 may fit tightly around and conform to the outside of the other elements of the optical-fiber cable 10 (e.g. the buffer tubes 14) in such a way that it substantially fills the interstices (i.e., the gaps) between adjacent buffer tubes 14. See FIG. 5. In this particular embodiment, the protective outer jacket 18 is thin (e.g., 0.6 millimeter thick or so) so that the external surface of the optical-fiber cable 10 varies in distance from the center of the optical-fiber cable 10 (i.e., it is textured rather than smooth).

Figure 5:
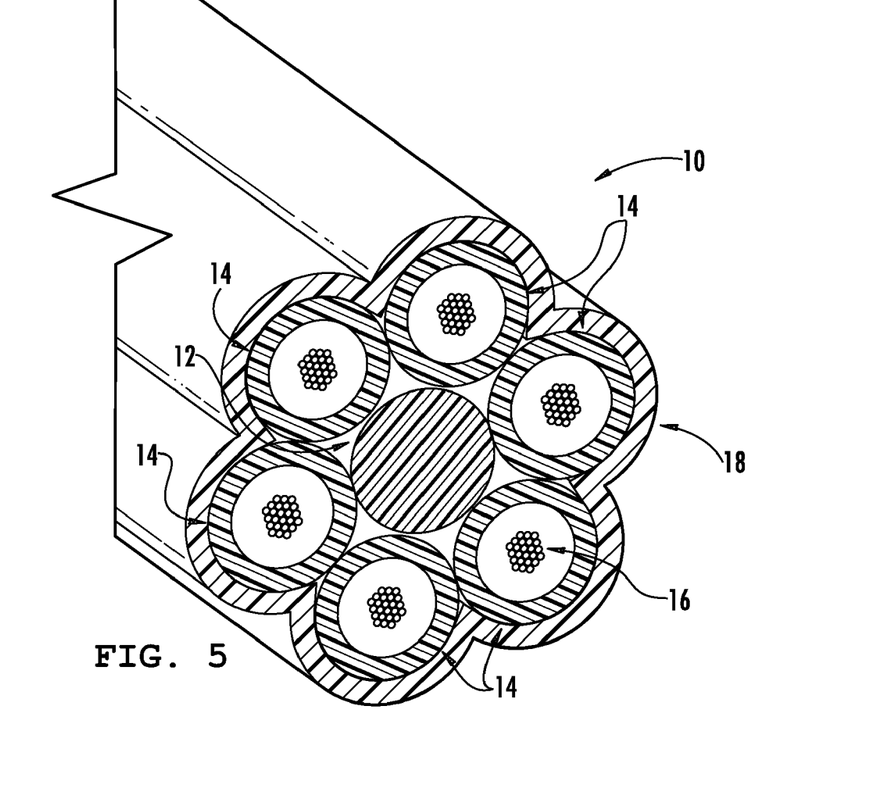
FIG. 5 schematically depicts a perspective, cross-sectional view of an exemplary embodiment of an optical-fiber cable employing buffer tubes according to the present invention.

In some embodiments including a thin protective outer jacket 18, the buffer tubes 14 are stranded (e.g., S stranded or S-Z stranded) around the central strength member 12. In such embodiments, the textured outer surface of the optical-fiber cable 10 periodically varies lengthwise along the cable 10 in a manner that replicates the stranded shape of the underlying buffer tubes 14. The textured profile of the protective outer jacket 18 of this embodiment further improves the blowing performance of the optical-fiber cable 10. The textured surface reduces the contact surface between the cable 10 and the microduct and increases the friction between the blowing medium (e.g., air or liquid) and the cable 10.

The protective outer jacket 18 may be made of a low coefficient-of-friction material, which can facilitate blown installation. Yet, in other embodiments, the protective outer jacket 18 can be provided with a lubricant to further facilitate blown installation. The protective outer jacket 18 may include other materials known by those having ordinary skill in the art to be suitable for use as a protective outer jacket 18 (e.g., polymeric materials such as PVC or nylons).

FIG. 4 depicts a cross-sectional view of an exemplary embodiment of an optical-fiber cable 10 in accordance with the present invention. Those having ordinary skill in the art will appreciate that FIG. 4 is a schematic representation that is not necessarily drawn to scale.

In this embodiment, the optical-fiber cable 10 includes a central strength member 12 positioned at the middle of the optical-fiber cable 10. Buffer tubes 14 are provided externally adjacent to the central strength member 12. Each tube 14 contains an equal number of optical fibers 16. Finally, a protective outer jacket 18 is provided around the buffer tubes 14 and the central strength member 12.

The optical fibers 16 may be loosely placed in the buffer tubes 14. Because the optical fibers 16 typically bunch together within the buffer tubes 14, the optical fibers 16 are depicted in FIG. 4 as centrally located bundles within the buffer tubes 14. Those having ordinary skill in the art will recognize that this bundling sometimes occurs because a lubricant or release agent (e.g., silicone oil) may be applied to the optical fibers 16 during the manufacturing of the optical-fiber cable 10. The lubricant or release agent facilitates the removal of excess fiber length (EFL) during manufacturing and field operations. Despite this bundling, the optical-fiber cable 10 is considered to be a loose-tube optical-fiber cable.

FIG. 5 schematically depicts a cross-sectional, perspective view of another exemplary embodiment of an optical-fiber cable in accordance with the present invention. Those having ordinary skill in the art will appreciate that FIG. 5 is a schematic representation that is not necessarily drawn to scale.

The embodiment depicted in FIG. 5 contains the same elements depicted in FIG. 4 (i.e. optical-fiber cable 10, buffer tubes 14, central strength member 12, optical fibers 16 (not shown in all buffer tubes 14), and protective outer jacket 18). In this embodiment, however, the protective outer jacket 18 fits tightly around and conforms to the outside of the buffer tubes 14 in such a way that it substantially fills the gaps between adjacent buffer tubes 14. In this particular embodiment, the protective outer jacket 18 is thin (e.g., 0.6 millimeter thick or so) so that the external surface of the optical-fiber cable 10 is textured rather than smooth.

In another aspect, the invention embraces a method for installing an optical-fiber cable capable of mid-span storage and having a high fiber count and fiber packing density.

Typically, the optical-fiber cables of the present invention are installed in microducts via a blowing method. This method includes (i) providing a microduct having a starting point and an end point; (ii) guiding the optical-fiber cable from the starting point toward the end point (e.g., using a transfer medium); (iii) collecting the front end of the optical-fiber cable at the end point; and (iv) mechanically connecting the optical-fiber cable. Optionally, step (iii) further includes collecting (at the end point) the transfer medium employed (or water that is simply present) during the guiding (e.g., blowing) of the optical-fiber cable through the cable guide as set forth in step (ii).

The transfer medium used for the installation of the optical-fiber cable could be a gas (e.g., air) or other fluid. The transfer medium is pressurized within the microduct; inherent friction between the transfer medium and the optical-fiber cable forces the optical-fiber cable through the microduct.

Exemplary blowing installation methods and structures (e.g., plugs or pigs) are disclosed in the following commonly assigned patent documents, each of which is hereby incorporated by reference: U.S. Provisional Patent Application No. 60/969,401 for "Modified Pre-Ferrulized Communication Cable Assembly and Installation Method" (Griffioen et al.); U.S. Patent Application Publication No. US 2008/0317410 A1 and its related U.S. patent application Ser. No. 12/200,095 for a "Modified Pre-Ferrulized Communication Cable Assembly and Installation Method" (Griffioen et al.); and U.S. Pat. No. 7,574,095 and its related U.S. patent application Ser. No. 11/747,573 for a "Communication Cable Assembly and Installation Method" (Lock et al.).

U.S. Pat. No. 6,579,014, U.S. Pat. No. 6,648,520, and U.S. Patent Application Publication No. 2007/0047884, each of which is incorporated by reference in U.S. Provisional Application No. 61/139,228, are hereby incorporated by reference in their entirety.

This application incorporates entirely by reference the following commonly assigned patents, patent application publications, and patent applications: U.S. Pat. No. 7,483,613 for a Chromatic Dispersion Compensating Fiber (de Montmorillon et al.); U.S. patent application Ser. No. 12/098,804 for a Transmission Optical Fiber Having Large Effective Area (Sillard et al.), filed Apr. 7, 2008; U.S. patent application Ser. No. 12/418,523 for a Dispersion-Shifted Optical Fiber (Sillard et al.), filed Apr. 3, 2009; U.S. patent application Ser. No. 12/489,995 for a Wavelength Multiplexed Optical System with Multimode Optical Fibers, filed Jun. 23, 2009, (Lumineau et al.); and U.S. patent application Ser. No. 12/498,439 for a Multimode Optical Fibers, filed Jul. 7, 2009, (Gholami et al.).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); International Patent Application Publication No. WO 2007/013923 A2 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Patent Application Publication No. US2008/0145010 A1 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. patent application Ser. No. 12/391,327 for a Buffer Tube with Hollow Channels, filed Feb. 24, 2009, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); and U.S. patent application Ser. No. 12/557,086 for a High-Fiber-Density Optical Fiber Cable, filed Sep. 10, 2009, (Louie et al.).

In the specification and figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An optical-fiber buffer tube, comprising:
a polymeric tube; and
a plurality of optical fibers positioned within said polymeric tube, said optical fibers (i) complying with the ITU-T G.652.D recommendation but (ii) complying with neither the ITU-T G.657.A recommendation nor the ITU-T G.657.B recommendation;
wherein said optical fibers, at a wavelength of 1550 nanometers, have a microbending sensitivity of more than 4.0 (dB/km)/(gf/mm) when measured by an expandable drum apparatus at a temperature between about −30° C. and 60° C.;
wherein said optical-fiber buffer tube possesses a buffer-tube filling coefficient of between about 0.2 and 0.6; and
wherein, upon subjecting said optical-fiber buffer tube to the mid-span testing according to the USDA Rural Electrification Administration mid-span standard, (i) each of said optical fibers enclosed within said buffer tube has increased attenuation of no more than about 0.1 dB and (ii) said optical fibers enclosed within said buffer tube have a mean increased attenuation of no more than about 0.05 dB.

2. An optical-fiber buffer tube according to claim 1, wherein said buffer tube possesses a buffer-tube filling coefficient of between about 0.3 and 0.45.

3. An optical-fiber buffer tube according to claim 1, wherein said buffer tube possesses a buffer-tube filling coefficient of between about 0.33 and 0.4.

4. An optical-fiber buffer tube according to claim 1, wherein said polymeric tube is formed of a polymeric material exhibiting a post-extrusion shrinkage of less than about 0.4 percent.

5. An optical-fiber buffer tube according to claim 1, wherein said polymeric tube comprises nucleated polypropylene-polyethylene copolymer.

6. An optical-fiber buffer tube according to claim 1, wherein said polymeric tube comprises a nucleated polyolefin copolymer exhibiting a post-extrusion shrinkage of less than about 0.3 percent.

7. A fiber optic cable comprising one or more optical-fiber buffer tubes according to claim 1.

8. An FTTx system comprising at least a portion of an optical-fiber buffer tube according to claim 1.

9. An optical-fiber buffer tube, comprising:
a polymeric tube; and
a plurality of optical fibers positioned within said polymeric tube, said optical fibers (i) complying with the ITU-T G.652.D recommendation but (ii) complying with neither the ITU-T G.657.A recommendation nor the ITU-T G.657.B recommendation;

wherein said optical-fiber buffer tube possesses a buffer-tube filling coefficient of between about 0.3 and 0.5; and wherein, upon subjecting said optical-fiber buffer tube to the mid-span testing according to the GR-20-CORE mid-span standard, said optical fibers possess an average change in optical-fiber attenuation of no more than 0.15 dB at 1550 nanometers.

10. An optical-fiber buffer tube according to claim 9, wherein said buffer tube possesses a buffer-tube filling coefficient of between about 0.35 and 0.45.

11. An optical-fiber buffer tube according to claim 9, wherein said polymeric tube is formed of a polymeric material exhibiting a post-extrusion shrinkage of less than about 0.3 percent.

12. An optical-fiber buffer tube according to claim 9, wherein said polymeric tube comprises nucleated polypropylene copolymer.

13. An optical-fiber buffer tube according to claim 9, wherein said optical fibers, at a wavelength of 1550 nanometers, have a microbending sensitivity of more than 4.0 (dB/km)/(gf/mm) when measured by an expandable drum apparatus at a temperature between about −30° C. and 60° C.

14. An optical-fiber buffer tube, comprising:
a polymeric tube comprising nucleated polypropylene copolymer exhibiting a post-extrusion shrinkage of less than about 0.5 percent; and
a plurality of discrete single-mode optical fibers loosely positioned within said polymeric tube, said optical fibers (i) satisfying the ITU-T G.652 recommended fiber attributes with respect to single-mode optical fibers but (ii) complying with neither the ITU-T G.657.A recommendation nor the ITU-T G.657.B recommendation;
wherein said optical-fiber buffer tube possesses a buffer-tube filling coefficient of between about 0.2 and 0.5; and
wherein, upon subjecting said optical-fiber buffer tube to the mid-span testing according to the USDA Rural Electrification Administration mid-span standard, (i) each of said optical fibers enclosed within said buffer tube has increased attenuation of no more than about 0.1 dB and (ii) said optical fibers enclosed within said buffer tube have a mean increased attenuation of no more than about 0.05 dB.

15. An optical-fiber buffer tube according to claim 14, wherein said buffer tube possesses a buffer-tube filling coefficient of between 0.2 and 0.3.

16. An optical-fiber buffer tube according to claim 14, wherein said buffer tube possesses a buffer-tube filling coefficient of between about 0.3 and 0.4.

17. An optical-fiber buffer tube according to claim 14, wherein said polymeric tube comprises a nucleated polypropylene-polyethylene copolymer exhibiting a post-extrusion shrinkage of less than about 0.3 percent.

18. An optical-fiber buffer tube according to claim 14, comprising a thixotropic composition at least partially filling said polymeric tube.

19. An optical-fiber buffer tube according to claim 14, wherein said polymeric tube is substantially free of thixotropic compositions.

20. A fiber optic cable comprising one or more buffer tubes according to claim 14.

21. An optical-fiber buffer tube according to claim 14, wherein at least one of said optical fibers, at a wavelength of 1550 nanometers, has a microbending sensitivity of more than 4.0 (dB/km)/(gf/mm) when measured by an expandable drum apparatus at a temperature between about −30° C. and 60° C.

22. An optical-fiber buffer tube according to claim 14, wherein said optical fibers, at a wavelength of 1550 nanometers, have a microbending sensitivity of more than 4.0 (dB/km)/(gf/mm) when measured by an expandable drum apparatus at a temperature between about −30° C. and 60° C.

23. An optical-fiber buffer tube, comprising:
a polymeric tube; and
a plurality of optical fibers positioned within said polymeric tube, said optical fibers (i) complying with the ITU-T G.652.D recommendation but (ii) complying with neither the ITU-T G.657.A recommendation nor the ITU-T G.657.B recommendation;
wherein said optical-fiber buffer tube possesses a buffer-tube filling coefficient of between about 0.28 and 0.6; and
wherein, upon subjecting said optical-fiber buffer tube to the mid-span testing according to the USDA Rural Electrification Administration mid-span standard, (i) each of said optical fibers enclosed within said buffer tube has increased attenuation of no more than about 0.1 dB and (ii) said optical fibers enclosed within said buffer tube have a mean increased attenuation of no more than about 0.05 dB.

24. An optical-fiber buffer tube according to claim 23, wherein said buffer tube possesses a buffer-tube filling coefficient of between about 0.3 and 0.45.

25. An optical-fiber buffer tube according to claim 23, wherein at least one of said optical fibers, at a wavelength of 1550 nanometers, has a microbending sensitivity of more than 4.0 (dB/km)/(gf/mm) when measured by an expandable drum apparatus at a temperature between about −30° C. and 60° C.

26. An optical-fiber buffer tube according to claim 23, wherein said optical fibers, at a wavelength of 1550 nanometers, have a microbending sensitivity of more than 4.0 (dB/km)/(gf/mm) when measured by an expandable drum apparatus at a temperature between about −30° C. and 60° C.

* * * * *